United States Patent [19]

McFarland

[11] Patent Number: 5,217,646
[45] Date of Patent: Jun. 8, 1993

[54] ULTRA VIOLET INDICATION FOR FABRIC PROTECTION

[76] Inventor: Steven M. McFarland, 1204 Sassone Ct., Milpitas, Calif. 95035

[21] Appl. No.: 781,923

[22] Filed: Oct. 24, 1991

[51] Int. Cl.$^5$ .................. C09K 11/02; C09K 11/06
[52] U.S. Cl. ..................... 252/301.35; 252/301.16
[58] Field of Search ................................ 252/301.35

[56] References Cited

U.S. PATENT DOCUMENTS 4,442,017  4/1984  Blumberg ..................... 252/301.35

OTHER PUBLICATIONS

Levene, "Surface Whitened, Shrink Resistant Wool Cloth . . . ", *Textile Research Journal*, May 1987, pp. 298–306.

*Primary Examiner*—Ellen McAvoy
*Attorney, Agent, or Firm*—Richard L. Miller

[57] ABSTRACT

An ultra-violet tag dye, visible only when exposed to ultra-violet light is blended with a fabric protection compound in a suitable evaporative carrier for application to a fabric so that, after evaporation of the carrier, the extent of coverage can only be detected visually by exposure to ultra-violet light. A suitable fluorescent dye has the composition 2,2'-(2,5-thiophenediyl) bis (5-tert-butylbenzoxazole).

25 Claims, No Drawings

ULTRA VIOLET INDICATION FOR FABRIC PROTECTION

BACKGROUND OF THE INVENTION

1. Field of the Invention

The invention relates to the ultra-violet indication of fabric protection.

2. Description of the Prior Art

Numerous methods have been provided in the prior art that are adapted to treat fabric. For example, U.S. patents numbered 3,987,227 to Schultz et al; 4,781,993 to Bhatt; 4,902,434 to Dickerson and application data sheet on Uvitex OB of CIBA-GEIGY Corp. all are illustrative of such prior art. While these methods may be suitable for the particular purpose to which they address, they would not be as suitable for the purpose of the present invention as hereafter described.

SUMMARY OF THE INVENTION

Fabric protection, for soil, stain, and water proofing, for example, is commonly obtained by the application of a fluorochemical or silicone coating after the manufacture of the fabric (for example, by weaving) and has been in widespread commercial use for many years.

Such protective coatings are generally of two types which derive from either the fluorochemical or silicone families, the former being carried during application to the fabric by chlorinated solvents (such as tricholoroethane, 1,1,1; methylene chloride, glycol ethers, aqueous or other solutions), while those of the silicon family are usually carried by mineral spirit solutions. In all cases, the fabric, whether upholstery fabric, carpeting fabric, drapery fabric or apparel fabric is allowed drying time after application enabling evaporation of the carrier.

Commonly known examples of protective compounds are known as TEFLON ® (Trademark), ZONYL ® (Trademark of DuPont) MILEASE ® (Trademark of ICI) F-62 ® or F-65 ®, and SCOTCHGARD ® (Trademark of 3M).

A problem arises in that the protective coatings must be clear or invisible in ambient light, (daylight, white incandescent or fluorescent light), to avoid affecting the appearance of the fabric but, on the other hand it is important to be able to verify that the fabric is coated adequately both before and after wear by the user.

Existing methods of detection which include fabric burn, water repellency and abrasion are disadvantageous and clearly not wholly suitable for optimal quality control on the mass production line.

According to one aspect of the present invention, a fabric coating fluid comprises a mixture of an ultra-violet light indicating dye and a fabric protecting ingredient blended in an evaporative carrier for application to a fabric to provide, after evaporation, a coating invisible in ambient light but visible when exposed to ultra-violet light, thereby to indicate the presence of the coating.

Thus, the completeness of the fabric coating can be verified both without recourse to destruction testing, merely by exposure to ultra-violet light and without interrupting the production line improving the efficiency of mass production.

The invention includes a method of detecting a protective coating on a fabric which coating is visible only by exposure to ultra-violet light or spectrofluorometer, by mixing a clear, ultra-violet indicating dye and a fabric protecting ingredient together in a carrier; applying the mixture to a fabric by coating; drying the fabric so coated thereby evaporating the carrier and subsequently exposing the coated fabric to ultra-violet light. The invention will also enable the efficient and effective identity of the protectant maker by altering the dye color spectrum as well as via concentration of solution.

In addition, both production application methods as well as retail application methods may be accomodated including foam, pump sprayer and aerosol mixture applications.

EXAMPLE

An example of the invention will now be described in the context of an experiment as to whether a fluorescent tag dye applied to a fabric can withstand accelerated aging over a period of six months and still be visible only by exposure to ultra-violet (black) light.

The particular dye used can be identified as "C-206" supplied by Shannon Luminous Materials Inc. of Santa Ana, California, and is available as either a crystalline powder or in liquid form. More specifically, the dye may be identified as follows:

Chemical name: Benzoxazole, 2,2'-(2,5-thiophenediyl) bis(5-1,1-dimethylethyl)

CAS number: 7128-64-5

Common Name:

2,2'-(2,5-thiophenediyl)bis(5-tert-butylbenzoxazole);

2,5-bis(5-tert-butyl-2-benzoxazolyl)thiophene;

UVITEX(Trademark) ob

Aka: UVITEX OR UVITEX ob

Aka: Fluorescent dye C-206

Fabric coating fluids were prepared comprising the dye in two different concentrations of 100 ppm (parts per million) and 2000 ppm, respectively in both trichloroethane 1,1,1 and water mixed with a fluorchemical coating. Amounts of 1 milliliter of each solution were applied with cotton swabs to respective squares of fabric, each of four square inches in area. An equal volume of a TEFLON (ZONYL) ® PTFE coating sold by Ashland Chemical, Inc. of Columbus, Ohio as SBA-1 was applied to another, equally sized, piece of fabric. An additional, equally sized, fabric square was designated as the control sample.

Each fabric square was then placed into an over for a period of six months to simulate accelerated aging.

After six months of accelerated aging, all samples were still indistinguishable from each other under ambient light conditions. The fabrics treated with the TEFLON (ZONYL) ® coating did not show any stains or discoloration.

Under ultra-violet (black) light, the fabric coated with the dye exhibited a yellowish glow. However, while the sample coated with the concentration of 2000 pm glowed brightly and was easily distinguished, the fabric coated with the 100 ppm concentration required close observation to detect the presence of the dye. The remaining samples coated only with the TEFLON (ZONYL) ® did not show any glow.

As a result, it was concluded that the concentration of 100 ppm of the dye C-206 was insufficient for useful detection after a six month aging period.

In view of the brightness of the more concentrated sample it was deduced that a preferred concentration would be in the 500–1000 ppm range.

While various carriers such as trichloroethane 1,1,1,; methylene chloride; glycol ether; water and mineral spirits may be used for the fluorochemical protective coatings mineral spirits is generally used as a carrier for coatings of the silicon family.

The ultra-violet tag dye may also be introduced to "tailor soap" pr "tailor chalk" for marking apparel, particularly when light colored fabrics are used. The dye may be applied by a felt marking pen or similar device, particularly useful for marking the inside of fabric cushions. This would overcome a problem which currently arises as fabric cutters now mark using graphite pencils or permanent markers which tend to flow through the cushions, carpets, and other fabrics when cleaned by consumers or professionals.

In addition, the ultra-violet tag dye may be introduced into a chalk compound to increase visibility for marking streets, building materials, etc.

It should be noted that the ultra-violet tag dye is retained in fabrics, despite washing by the fluorochemical bonding.

Without further analysis, the foregoing will so fully reveal the gist of this invention that those skilled in the art can by applying current knowledge thereto readily adapt it for various applications without omitting certain features which can constitute essential characteristics of the generic or specific aspects of this invention. Therefore, a more lengthy description is deemed unnecessary.

It is intended that various changes may be made in this invention in the practical development thereof, if desired. Such changes are comprehended within the meaning and range of equivalency of the following claims. The invention, therefor, is not to be restricted except as is necessitated by the prior art.

What is claimed is:

1. A fabric coating fluid comprising of an ultra-violet light indicating dye which is clear in ambient light and a fabric protecting ingredient of a flourochemical coating mixed with a solvent of an evaporative carrier for application to a fabric to provide, after evaporation, a coating invisible in ambient light but visible when exposed to ultra-violet light thereby to indicate the presence of the coating.

2. A fabric coating fluid according to claim 1 in which the dye is a fluorescent dye having the composition of 2,2'-(2,5-thiophenediyl) bis (5-tert-butylbenzoxazole).

3. A fabric coating fluid according to claim 2 in which the solvent is one of chlorinated solvent and glycol ethers and aqueous solutions and mineral spirits solutions.

4. A fabric coating fluid according to claim 3 in which the said dye is in concentration of 0.0001%–1% in solution.

5. A fabric coating fluid according to claim 3 in which said dye is in concentration of 0.01%–0.2%.

6. A fabric coating fluid according to claim 3 in which the said dye is in concentration of 0.05%–0.1%.

7. A fabric coating fluid comprising of an ultra-violet light indicating dye which is clear in ambient light and a fabric protecting ingredient of a silicone coating mixed with a solvent of an evaporative carrier for application to a fabric to provide, after evaporation, a coating invisible in ambient light but visible when exposed to ultra-violet light thereby to indicate the presence of the coating.

8. A fabric coating fluid according to claim 7 in which the dye is a fluorescent dye having the composition of 2,2'-(2,5-thiophenediyl) bis (5-tert-butylbenzoxazole).

9. A fabric coating fluid according to claim 8 in which the solvent is a mineral spirits solutions.

10. A fabric coating fluid according to claim 9 in which the said dye is in concentration of 0.0001%–1% in solution.

11. A fabric coating fluid according to claim 9 in which said dye is in concentration of 0.01%–0.2%.

12. A fabric coating fluid according to claim 9 in which the said dye is in concentration of 0.05%–0.1%.

13. A method of detecting a protective coating on a fabric which coating is visible only by exposure to ultra-violet light, by mixing a clear, ultra-violet indicating dye and a fabric protecting ingredient together in a solvent carrier; applying the mixture to a fabric by coating; drying the fabric so coated thereby evaporating the carrier and subsequently exposing the coated fabric to ultra-violet light.

14. A method according to claim 13 in which the dye is a fluorescent dye having the composition of 2,2'-(2,5-thiophenediyl) bis (5-tert-butylbenzoxazole).

15. A method according to claim 13 in which the solvent is one of chlorinated solvent and glycol ethers and aqueous solutions and mineral spirits solutions.

16. A method according to claim 15 in which the protective ingredient is polytetrafluoroethylene.

17. A method according to claim 15 in which the said dye is in concentration of 0.0001%–1% in solution.

18. A method according to claim 16 in which said dye is in concentration of 0.01%–0.2%.

19. A method according to claim 16 in which the said dye is in concentration of 0.05%–0.1%.

20. A method according to claim 13 in which the solvent is a mineral spirits solutions.

21. A method according to claim 20 in which the said dye is in concentration of 0.0001%–1% in solution.

22. A method according to claim 20 in which said dye is in concentration of 0.01%–0.2%.

23. A method according to claim 20 in which the said dye is in concentration of 0.05%–0.1%.

24. A method of detecting a protective coating on a fabric which coating is visible only by exposure to ultra-violet light, by mixing a clear, ultra-violet indicating dye and a fluoro-chemical fabric protecting ingredient together in a carrier; applying the mixture to a fabric by coating; drying the fabric so coated thereby evaporating the carrier and subsequently exposing the coated fabric to ultra-violet light.

25. A method according to claim 24 in which the dye is a fluorescent dye having the composition of 2,2'-(2,5-thiophenediyl) bis (5-tert-butylbenzoxazole).

* * * * *